United States Patent [19]

Lydiate

[11] 4,221,872

[45] Sep. 9, 1980

[54] PROCESS FOR REMOVING UNSATURATION FROM ION EXCHANGE RESINS CONTAINING UNQUATERNIZED AMINO GROUPS BY HYDROGENATION WITH IMINE

[75] Inventor: Jack Lydiate, East Rosanna, Australia

[73] Assignee: ICI Australia Limited, Melbourne, Australia

[21] Appl. No.: 962,481

[22] Filed: Nov. 20, 1978

[30] Foreign Application Priority Data

Nov. 28, 1977 [AU] Australia .............................. PD2586

[51] Int. Cl.² .......................... C08L 23/26; C08F 8/04; C08F 26/00
[52] U.S. Cl. ..................................... 521/32; 525/376; 521/38
[58] Field of Search ...................... 521/32; 526/51, 38, 526/40, 49

[56] References Cited

U.S. PATENT DOCUMENTS

| | | | |
|---|---|---|---|
| 3,297,674 | 1/1967 | Breslow et al. | 526/51 |
| 4,031,068 | 6/1977 | Cantor | 526/38 |

*Primary Examiner*—Joseph L. Schofer
*Assistant Examiner*—Peter F. Kulkosky
*Attorney, Agent, or Firm*—Cushman, Darby & Cushman

[57] ABSTRACT

A process of removing unsaturation from resins by reaction with diimine. Thermally regenerable ion exchange resins are prepared by the hydrogenation of unsaturated polymers containing unquaternized amino groups with diimine. Procedures for generating the reactive diimine intermediate from precursors such as hydrazine are described.

18 Claims, No Drawings

PROCESS FOR REMOVING UNSATURATION FROM ION EXCHANGE RESINS CONTAINING UNQUATERNIZED AMINO GROUPS BY HYDROGENATION WITH IMINE

This invention relates to ion exchange resins and in particular to the weakly basic ion exchange resin components in thermally regenerable ion exchange resins.

Thermally regenerable resins have a potentially important application in water demineralization processes because low-grade heat can be efficiently employed for regeneration and certain of these resins are of use in the desalination of water. Also, thermal regeneration as opposed to conventional regeneration using excess acid and alkali, does not discharge an additional load of regenerant chemicals to the environment, since the effluent contains only the salt stripped from the resins.

Processes of ion exchange using thermally regenerable resins are described in the publications:
Australian Patent Specification Nos. 274,029 and 434,130,
"An Ion Exchange Process with Thermal Regeneration"
Part I, J. Inst. Engr. Aust (1965), 37, 193
Part II, Aust. J. Chem. (1966) 19, 561
Part III, Aust. J. Chem. 589
Part IV, Aust. J. Chem. 765
Part V, Aust. J. Chem. 791
Part VI, Aust. J. Chem. (1968) 21, 2703
Part VII, Desalination (1970) 8, 21
Part VIII, Desalination (1973) 12, 217
Part IX, Desalination (1973) 13, 269
"Desalination by Thermally Regenerable Ion Exchange"
Proc. Roy. Aust. Chem. Inst. (1976) 43, 345.

In the "Sirotherm" ("Sirotherm" is a Registered Trade Mark of ICI Australia Ltd) process referred to above, salt solutions are partially demineralized by a mixture of weak acid and weak base resins which are regenerated thermally.

The resins may be used in separate beds or in mixed beds containing both the acid and base resins. Alternatively the acid and base exchange sites may be combined in an amphoteric resin where the acidic and basic functional groups (anion and cation exchange sites respectively) are attached to a common polymer "backbone." The acid and base sites may also be contained in a resin of the "snake-cage" type in which the functional groups are attached to separate, but intertwined, polymer chains.

In one form of the demineralization process, a composite absorbent is employed in particulate form comprising particulate acidic and basic ion exchange materials dispersed in a homogenous matrix of a water-insoluble and water- and ion-permeable polymeric material. By "homogeneous" is meant a material of uniform chemical composition and physical continuity, i.e. composed of a single mass of material rather than a physical agglomeration of smaller bodies, such as particles or fibres. The matrix materials may contain voids or pores. For example, it may have a degree of porosity such as that encountered in so-called "macroporous" ion exchange resins.

The matrix materials for the adsorbents need to combine adequate mechanical toughness with high permeability to the ions which are to be removed from a solution treated with the composite adsorbent. The matrix should also be stable to the repeated thermal cycling inherent in the "Sirotherm" process.

The thermally regenerable resins have been developed which have good mechanical strength and high thermal stability. However the weak base resins are slowly oxidized by oxygen at the hot regeneration temperature. Various approaches have been tried in an effort to remove oxygen dissolved in the feed water to ensure an economic operating life for the resin. These approaches include vacuum de-aeration, stripping with natural gas, or combined coagulation and de-aeration by ferrous ions. However such treatments are not always effective and they add considerably to the processing costs.

The resin equilibria are extremely complex, some of the variables being the detailed polymeric structure of the resins, the acidity and basicity of the functional groups, the ratio of acidic to basic groups, the resin affinities for counter ions, the pH, the ionic strength, and the temperature.

Following the synthesis of resins of different structure it was found that the number of exchange sites available for thermal regeneration can be greatly increased if the base resin contains secondary or tertiary amino groups, and the resin backbone and subsequent groups on the nitrogen are non-polar character.

All amine resins are susceptible to oxidation at the regenerating temperatures used in the "Sirotherm" process, but resins containing residual unsaturation undergo more serious degradation. Suitable resins for the "Sirotherm" process, based, for example, on polytriallylamines, are particularly susceptible since a major proportion of pendant allyl groups do not take part in crosslinking. By "pendant allyl groups" is meant those allyl groups of the monomer that remain after the linear polymerization stage. Therefore it is desirable to remove the oxygen from the feed water or to use resins with a low unsaturation content.

A bisulphite is a very efficient oxygen scavenger, it has been considered for treatment of feed water before passage over the thermally-regenerable resins. A bisulphite can be added directly to the feed water or, more conveniently a sulphite such as sodium sulphite can be added to give rise to bisulphite ions in situ. Unfortunately reaction of resins containing unsaturated groups with bisulphite produces a modified resin whose ion-exchange capacity and titration curve characteristics are unacceptable for use in the thermally regenerable resin water treatment process. In fact with a typical resin, such as one based on polytriallylamine, the ion-exchange capacity after sulphite treatment is negligible.

Hence it is desirable to provide a polyamine resin containing minimum unsaturation for use in thermally regenerable ion-exchange processes if oxygen is present in the feed water even where sulphite or bisulphite treatment is used to remove oxygen from feed water.

Many reagents that react with olefinic unsaturation in resins have been tried to produce such desirable resins, but those that have been effective in removing the unsaturation have produced adverse properties in the resin. Such unsuitable reagents include for example, chlorine water, bromine, iodine, mercuric acetate, thioglycollic acid and $\beta$-mercaptoethanol. Diborane will react readily with the olefinic bond but there is great difficulty in removing all the boron. Methyl mercaptan will not remove more than 50% of the residual unsaturation. These reagents either destroy the necessary flat titration curve of the amine resin or generate acidic groups leading to internal self-neutralization of the resin and consequent loss of ion-exchange capacity.

One possible approach is to remove the residual unsaturation by hydrogenation. This would convert, for example, pendent allyl groups to propyl groups without introducing functional groups that can interfere with the ion-exchange properties of the resin.

Hydrogenation frequently involves the use of heterogeneous catalysts. These are inappropriate with the ion-exchange resins since the highly improbable solid-state transfer of hydrogen from catalyst surface to resin would have to occur. Even if this did occur, it would be limited to hydrogenation of the surface of the resin. Catalytic hydrogenation has been limited to treatment of soluble polymers, and even then appreciable degradation of the polymeric chain backbone occurs.

Use of homogeneous catalysts has been considered but these usually contain heavy metals such as ruthenium, rhodium or iridium, which could prove difficult to remove from the resin. In addition these catalysts are very costly and the expense would be prohibitive if tonne quantities of resin were to be treated.

We have found, however, a convenient hydrogenation procedure for ion-exchange resins which does not involve the use of hydrogen itself, but instead employs the reactive intermediate diimine (HN=NH) and produces resins having the desirable low unsaturation content.

Accordingly we provide a process for the manufacture of an ion-exchange resin by hydrogenating a polymeric ion-exchange resin containing unsaturated olefinic bonds wherein said polymeric resin is reacted in a liquid reaction medium with diimine.

Diimine exists as a transient intermediate and cannot be isolated under normal conditions. Procedures for generating diimine from precursors in situ are well known to those skilled in the art and include for example the reaction of hydrazine and an oxidizing agent.

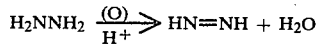

or direct generation from precursors such as azodicarboxylates

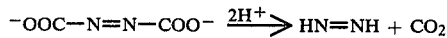

or arylsulphonhydrazides:

Other methods include the alkaline-catalyzed decomposition of chloroacetyl hydrazide, hydrolysis of diene adducts of azodicarboxylates, reaction of cyclohexanone and hydroxylamine-O-sulphonic acid, and the alkaline cleavage of choramine.

Any of these prior art methods may be used to generate the diimine for the process of our invention. For the oxidation of hydrazine, for example, the most effective oxidizing agents are those which act as di-electron donators such as oxygen and hydrogen peroxide.

For the hydrogenation stage of the process of our invention, two molecules of hydrazine are required for each olefinic bond. Preferably a carboxylic acid function is present, and if this is not already in the ion-exchange resin, a carboxylic acid may be added to the reaction medium. The carboxylic acid is not narrowly critical and may, for example, be an aromatic or aliphatic carboxylic acid. Preferably an aliphatic acid, such as acetic acid, is used. Preferably the pH of the reaction medium is in the range of 8.5 to 9.0.

The reaction medium used in our process must be a solvent for hydrazine, and preferably will be capable of swelling the resin so that good penetration of diimine will occur. The preferred solvents are water and aliphatic alcohols such as methanol, ethanol, propanol and ethylene glycol, and glycol ethers such as 2-methoxy ethanol and 2-ethoxy ethanol.

The temperature for the hydrogenation is not narrowly critical. Ambient temperatures may be conveniently used, or if necessary, a higher temperature employed to shorten the reaction time. Where heat is required for the generation of the diimine, as for example when an aryl sulphonhydrazide is used, the hydrogenation will proceed rapidly with the diimine being consumed as it is formed.

In general any resin comprising unquaternized amino groups and unsaturated olefinic bonds is suitable for hydrogenation by the process of this invention. Weakly basic ion-exchange resins suitable for use in thermally regenerable ion-exchange resins crosslinked poly(vinylbenzyldialkylamine), and copolymers derived from N-alkylethyleneimines or N-substituted aminoalkyl acrylates or methacrylates with suitable crosslinking agents are examples of suitable resins.

Preferably the basic resin is a polymer or a copolymer formed from a major proportion of an allylamine monomer. Suitable allylamines include, for example, allylamine, diallylamine, triallylamine and alkyldiallylamines.

Preferred allylamines for use in the preparation of thermally regenerable ion-exchange resins include, for example: triallylamine, methyldiallylamine, ethyldiallylamine, 1,4-bis(N,N-diallylaminomethyl)benzene 2,4,6-tris(N,N-diallylaminomethyl)toluene, 1,2,4-tris(N,N-diallylaminomethyl)benzene, 1,6-bis(N,N-diallylamino)hexane, n-propyldiallylamine, and benzyldiallylamine.

Additional crosslinkers may be added to the polymerization system and to obtain adequate crosslinking it is necessary to add a crosslinking agent when amines containing only two or less allyl groups are used. Suitable crosslinking agents are well known in the art and include for example, ethylene glycol dimethacrylate, 1,3-butylene glycol dimethacrylate, divinyl-benzene, triallyl cyanurate, the triallyl ether of pentaerythritol and bis-diallylamines such as N,N,N',N'-tetraallyl-1,6-diaminohexane.

Preferably the crosslinking agent is a salt of triallylamine or of a bis(diallylamino)alkane wherein the chain contains from 2 to 8 carbon atoms.

When the process of the invention is applied to composite resins the nature of the weak acid ion-exchange resin component is not narrowly critical. Small particles or beads of crosslinked polymer with weakly acidic functional groups or derivatives thereof may be prepared using suitable derivatives of ethylenically unsaturated carboxylic acids such as the lower alkyl esters of acrylic acid, methacrylic acid, fumaric acid, maleic acid and glutaconic acid.

Suitable crosslinking agents for preparing the weak acid resin particles are compounds with more than one ethylenically unsaturated group and include divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylenedimethacrylamide, N,N'-ethylenediacrylamide, trivinylbenzene, trivinylnaphthalene, polyvinylanthracenes and the polyallyl and polyvinyl ethers of glycol, glycerol, pentaerythritol, resorcinol and the monothio or dithio derivatives of glycols.

The invention is now illustrated by, but by no means limited to, the following examples. All parts and percentages are by weight unless otherwise specified.

EXAMPLES 1 to 4

These examples illustrate the diimine hydrogenation of polytriallylamine, a typical basic component of thermally regenerable ion-exchange resins.

Polytriallylamine (40 g) was added to water (1000 ml) and the pH of the suspension adjusted to 9.0 with dilute sodium hydroxide. Hydrazine hydrate (99%, 52 g; 6:1 mole ratio of hydrazine to olefinic bond) and glacial acetic acid (62.5 g) were added. The suspension was stirred gently at 50°–55° C. and industrial grade air bubbled through the solution for 6 hours. The pH drops as the reaction proceeds so the pH was readjusted at regular intervals to pH 9.0 with dilute sodium hydroxide. After the reaction was complete the pH was adjusted to 14 and the stirring continued for several hours prior to centrifugation. The product was washed several times with water and then methanol, and finally dried at 60° C. in vacuo.

The amount of olefinic unsaturation in the resin before and after the reaction was estimated semiquantitatively by infra red analysis (strongest characteristic absorption band at 910 cm$^{-1}$ associated with $CH_2$ out-of-plane deformation of $-CH=CH_2$). A more accurate measurement was obtained by treating the resin with excess 2M sodium bisulphite and subsequent sulphur analysis to measure the uptake of bisulphite.

Since polytriallylamine in the free base form is hydrophobic, the water was replaced by methanol in a second experiment so that greater swelling of the resin would occur (Example 2). The hydrogenation increased to 92%.

Example 3 illustrates the further increase in percent hydrogenation with methanol as solvent when the time for passage of air was increased to 20 hours.

Example 4 illustrates the use of potassium azodicarboxylate to generate the diimine.

TABLE 1

| Example | Source of diimine | Solvent | Time (hrs) | Sulphur content* (% w/w) | Hydrogenation (%) |
|---|---|---|---|---|---|
| 1 | Hydrazine, air, acetic acid | Water | 6 | 5.9 | 50 |
| 2 | Hydrazine, air, acetic acid | Methanol | 6 | 1.0 | 92 |
| 3 | Hydrazine, air, acetic acid | " | 20 | — | 95 |
| 4 | Potassium azodicarboxylate, acetic acid | " | 72 | 0.7 | 95 |

*10.3% On original polytriallylamine

EXAMPLE 5

This illustrates the incorporation of the hydrogenated basic resin into composite resins. The hydrogenated polytriallylamine of Example 3 was incorporated, together with polyacrylic acid resin particles, into a polyvinylalcohol matrix crosslinked with glutaraldehyde (Resin A, Table 2). For comparison a similar composite resin (Resin B) was prepared from the non-hydrogenated polytriallylamine. The base and acid capacities of the composite resins were measured with and without sulphite in the feed water. Resin A based on the hydrogenated polytriallylamine was highly sulphite-resistant and showed negligible losses in base and thermal capacities after sulphite treatment. The salt uptake capacity tests were carried out with sodium chloride solutions at a concentration of 8.5 milliequivalents (meq)/liter. The salt uptake and base and acid capacities in Table 2 are in meq/gram.

TABLE 2

| | Resin A | | Resin B | |
|---|---|---|---|---|
| | | After sulphite treatment | | After sulphite treatment |
| Base capacity | 1.57 | 1.54 | 1.54 | 0.02 |
| Acid capacity | 3.35 | 3.4 | 2.92 | 3.93 |
| Resin ratio | 2.14 | 2.21 | 1.90 | — |
| $t_{\frac{1}{2}}$ (mins) | 2.76 | 2.77 | 4.9 | — |
| Salt uptake | 1.378 | 1.323 | 1.29 | 0.04 |

EXAMPLE 6

This example illustrates the hydrogenation of base "plums" mixed with acid plums. Mixing of base and acid plums is often used during manufacture of composite resins since agglomerates form and the latter are more easily handled in procedures such as centrifugation.

A mixture of polytriallylamine (pTAA) and polymethacrylic acid (pMAA) plums was equilibrated with 2M aqueous sodium hydroxide to convert the pTAA to the base form and the pMAA to the Na$^+$ salt form. The mixed plums were filtered and washed several times with water and finally with methanol.

Methanol (500 ml) was added to a sample of mixed plums (47.25 g) and the suspension stirred vigorously in a "Silverson" mill ("Silverson" is a Registered Trade Mark) to break up lumps of mixed plums. Hydrazine hydrate (99%, 25.1 g) and glacial acetic acid (31.1 g) were added and the suspension gently stirred at 50°–55° C. and air bubbled through at a reasonable rate for 24 hours. A small sample was removed and stirred at pH 14 for a half hour and then filtered, washed with water and methanol and finally dried at 60° C. under vacuum. Infra red analysis (KBr disc) indicated that almost quantitative reduction had taken place.

The vessel contents were cooled, acidified to pH 3 with dilute $H_2SO_4$ and stirred for 1 hour. The contents were filtered and washed with water until the washings were neutral. The filter cake was dried as much as possible on the vacuum filter and converted into a composite resin in this form (Resin C).

A composite resin was also prepared from a mixture of the pTAA and pMAA plums (Resin D). The comparison of acid/base capacity, resin ratio and salt uptake for Resins C and D are given in Table 3. Due to the high matrix content of Resin C, it was found necessary to convert the salt uptake capacities to a no-matrix base to provide a clear comparison.

TABLE 3

|  | Resin C | | |
| --- | --- | --- | --- |
|  |  | After sulphite treatment | Resin D |
| Base capacity | 1.11 | 1.05 | 1.33 |
| Acid capacity | 2.03 | 2.19 | 2.57 |
| % Matrix | 58.9 | . | 49.4 |
| t₁ (mins) | 3.6 | 3.2 | 9.4 |
| Bulk density: | | | |
| g/ml | 0.114 | 0.11 | 0.19 |
| meq/ml | 0.10 | 0.09 | 0.18 |
| meq/g (salt) | 0.88 | 0.83 | 0.92 |
| ≡ No-matrix | 2.14 | 2.02 | 1.80 |
| Resin ratio | 1.83 | 2.09 | 1.94 |

EXAMPLE 7

This example illustrates the hydrogenation of polytriallylamine after incorporation into a composite resin. A sample of Resin B (50 ml, wet) was slurried in methanol (100 ml) and the pH adjusted to 9 with dilute aqueous NaOH. Hydrazine hydrate 99% 3.92 g and glacial acetic acid (4.7 g) were added and the reaction mixture stirred gently with air bubbling through for 1 day at 50°–55° C. The pH was adjusted to 9 several times during the period. The resin was filtered, washed with water and sucked as dry as possible on the filter (Resin E). A second sample of Resin B was treated by a similar procedure, but the passage of air was continued for 3 days (Resin F). Results are given in Table 4.

TABLE 4

|  | Resin B | | Resin E | | Resin F | |
| --- | --- | --- | --- | --- | --- | --- |
|  |  | After sulphite treatment |  | After sulphite treatment |  | After sulphite treatment |
| Base capacity | 1.54 | 0.02 | 1.56 | 1.32 | 1.48 | 1.42 |
| Acid capacity | 2.92 | 3.93 | 2.78 | 2.99 | 2.53 | 2.60 |
| Resin ratio | 1.90 | — | 1.78 | 2.27 | 1.71 | 1.82 |
| t₁ (mins) | 4.9 | — |  |  | 4.9 | 3.9 |

TABLE 4-continued

|  | Resin B | | Resin E | | Resin F | |
| --- | --- | --- | --- | --- | --- | --- |
|  |  | After sulphite treatment |  | After sulphite treatment |  | After sulphite treatment |
| Salt uptake | 1.29 | 0.04 | 1.23 | 0.99 | 1.29 | 1.15 |

I claim:

1. A process for the manufacture of an ion-exchange resin by hydrogenating an ion-exchange resin comprising unquaternized amino groups and unsaturated olefinic bonds wherein said polymeric resin is reacted in a liquid reaction medium with diimine.

2. A process according to claim 1 wherein said diimine is generated in situ from a precursor.

3. A process according to claim 2 wherein said precursor is hydrazine which is reacted with an oxidising agent.

4. A process according to claim 2 wherein said precursor is an azodicarboxylate.

5. A process according to claim 2 wherein said precursor is an arylsulphonhydrazide.

6. A process according to claim 2 wherein said precursor is chloroacetyl hydrazide.

7. A process according to claim 2 wherein said precursor is a diene adduct of azodicarboxylates.

8. A process according to claim 2 wherein said precursor is hydroxylamine-O-sulphonic acid.

9. A process according to claim 8 wherein said hydroxylamine-O-sulphonic acid is reacted with cyclohexanone to form the diimine.

10. A process according to claim 2 wherein said precursor is chloramine.

11. A process according to claim 3 wherein the reaction of the polymeric resin and the diimine generated from hydrazine is carried out in a reaction medium to which has been added a carboxylic acid.

12. A process according to claim 11 wherein said carboxylic acid is part of the polymeric resin.

13. A process according to claim 11 wherein said carboxylic acid is an aliphatic carboxylic acid.

14. A process according to claim 13 wherein said aliphatic carboxylic acid is acetic acid.

15. A process according to claim 3 wherein the reaction medium has a pH value in the range of 8.5 to 9.0 inclusive.

16. A process according to claim 3 wherein the reaction medium is a solvent for hydrazine.

17. A process according to claim 16 wherein the said solvent comprises a substance selected from the group consisting of water, aliphatic alcohols and glycol ethers.

18. A hydrogenated polymeric resin made by the process of claim 1.

* * * * *